Patented Dec. 7, 1926.

1,609,970

UNITED STATES PATENT OFFICE.

CARL ROBERT SCHROEDER, OF JERSEY CITY, NEW JERSEY, ASSIGNOR TO METAL & THERMIT CORPORATION, OF CHROME, NEW JERSEY, A CORPORATION OF NEW JERSEY.

METHOD OF EFFECTING EXOTHERMIC REACTIONS.

No Drawing.   Application filed October 31, 1923.   Serial No. 671,945.

The invention relates to certain improvements in the reduction of ores and oxides of the metals to produce substantially pure metals or alloys by means of exothermic reaction by metallic reducing agents, and has for its object the initiation of exothermic reaction by means of a more active reducing agent, and completing the reduction by means of a more sluggish or less active reducing agent, whereby the heat produced by the initial reaction will materially accelerate the final reaction by the less active reducing agent.

It is a well known metallurgical principle that certain metals, such as magnesium, manganese, aluminum, silicon, calcium, boron, etc., and probably titanium and zirconium, either in pure state or as a ferro-alloy, will reduce other metallic oxides such as iron oxide, chromium trioxide, tungsten oxide, vanadium pentoxide, cobalt oxide, nickel oxide, etc., exothermically, yielding the free metal and a slag consisting of the stable oxide of the reducing agent.

The well known thermit reaction developed by Dr. Hans Goldschmidt uses pulverized or ground aluminum to reduce metallic oxides producing metals in a molten state at high temperatures. The ready availability of aluminum as a reducing agent has been commercially applied to the manufacture of many pure metals and alloys such as pure manganese, ferro-tungsten, ferro-vanadium, etc. The ability of a metal to reduce any oxide exothermically depends upon the ratio of the heat of formation of the oxide to be reduced to the heat of formation of the stable oxide of the reducing metal. When the heat of formation of the latter is greater than that of the former, it is evident that an exothermic reduction will take place. The amount of excess of heat of formation of the second oxide over the first oxide is a measure of the effectiveness of the reaction and, therefore, the efficiency of the separation of the metal and the slag. Very often, an alumino-thermic mixture will not react with proper efficiency without supplying heat from some outside source such as a furnace before the reaction is initiated. The speed with which the reduction takes place is usually a measure of its effectiveness. Occasionally, the start of an exothermic reaction is extremely slow, but as more mixture is fed to the reaction, it speeds up gradually until a good separation of metal and slag is obtained. If the reaction fails to speed up, much heat is lost by radiation and both slag and metal become chilled and the metal is entrapped in the slag. When this happens, it is extremely expensive to recover this metal by crushing the entire mass and concentrating the metallics mechanically.

The present invention is based upon the discovery that a normally sluggish or slow exothermic reaction due to the character of the reducing agent employed may be accelerated by first reacting the metallic ore or oxide to be reduced with a pulverized or ground reducing metal which yields more heat, even though this latter reducing agent may be more expensive, or may tend to introduce objectionable impurities.

To illustrate my invention: Tungsten ore may be reduced by pulverized or ground silicon metal in the presence of fluorspar, as set forth in my Patent No. 1,533,519, dated April 14, 1925, but the start of the reaction is slow and sluggish when the mixture is reacted cold. I find that if tungsten ore is mixed with pulverized or ground aluminum and ignition effected in the usual manner with ignition powder, a hot molten bath is obtained. Into this hot molten bath is fed the cold or heated silico-thermic mixture referred to above with the result that it reacts immediately at a high efficiency. Another advantage of making ferro tungsten in two steps using two different reducing agents lies in the fact that the impurities in the metal may be kept lower than would ordinarily be the case if only one of the reducing agents was used. Manganese oxide for instance, which is an impurity in tungsten ores, is reduced by aluminum but is not affected by silicon; therefore, the amount of manganese brought down with the tungsten by the aluminum part of the reaction is considerably diluted by the manganese free tungsten reduced by the silicon part of the reaction. This applies also to the excess of reducing agents used. In the case illustrated, the percentage of aluminum and the percentage of silicon will be lower than if each part were reacted in separate crucibles.

What I claim is:

1. The method of reducing ores, oxides and the like, which comprises initially effecting exothermic reaction of the charge with a more active solid reducing agent, and completing the reduction by the addition of a less active solid reducing agent to the product of the first reaction.

2. The method of reducing ores, oxides and the like, which comprises initially effecting exothermic reaction of the charge with a more active metallic reducing agent, and completing the reduction by the addition of a less active reducing agent to the product of the first reaction.

3. The method of reducing ores, oxides and the like, which comprises initially effecting exothermic reaction of the charge with aluminum, and completing the reduction by the addition of a less active reducing agent to the product of the first reaction.

4. The method of reducing ores, oxides and the like, which comprises initiating exothermic reaction with aluminum, and completing the reduction with silicon.

5. The method of reducing ores and oxides of tungsten, which comprises initiating exothermic reaction with aluminum, and completing the reduction with a less active reducing agent.

6. The method of reducing ores and oxides of tungsten, which comprises initiating exothermic reaction with aluminum, and completing the reduction with silicon.

7. The method of reducing ores, oxides and the like, which comprises reacting the charge with a more active solid reducing agent in quantity sufficient to melt the charge, and completing the reduction by the addition of a less active solid reducing agent to the molten bath resulting from the first reaction.

In testimony whereof I affix my signature.

CARL ROBERT SCHROEDER.